(12) United States Patent
Chen et al.

(10) Patent No.: US 9,026,676 B1
(45) Date of Patent: *May 5, 2015

(54) SYSTEMS AND METHODS FOR PREPENDING NONCE LABELS TO DNS QUERIES TO ENHANCE SECURITY

(71) Applicant: Google Inc., Mountain View, CA (US)

(72) Inventors: Jeremy K. Chen, Piscataway, NJ (US); Alexander D. Nizhner, Bronx, NY (US); Paul S. R. Chisholm, Little Silver, NJ (US)

(73) Assignee: Google Inc., Mountain View, CA (US)

( * ) Notice: Subject to any disclaimer, the term of this patent is extended or adjusted under 35 U.S.C. 154(b) by 56 days.

This patent is subject to a terminal disclaimer.

(21) Appl. No.: 13/914,985

(22) Filed: Jun. 11, 2013

Related U.S. Application Data

(63) Continuation of application No. 12/903,349, filed on Oct. 13, 2010, now Pat. No. 8,484,377.

(51) Int. Cl.
*G06F 15/16* (2006.01)

(52) U.S. Cl.
CPC ........................................ *G06F 15/16* (2013.01)

(58) Field of Classification Search
CPC ................................................... H04L 61/1511
USPC ............ 709/245, 201; 726/2, 3, 22, 23, 5, 26, 726/27
See application file for complete search history.

(56) References Cited

U.S. PATENT DOCUMENTS

| 8,219,644 B2 * | 7/2012 | Drako et al. | 709/219 |
| 2010/0011420 A1 * | 1/2010 | Drako et al. | 726/5 |

* cited by examiner

*Primary Examiner* — Frantz Jean
(74) *Attorney, Agent, or Firm* — Lerner, David, Littenberg, Krumholz & Mentlik, LLP

(57) ABSTRACT

A method for prepending nonce labels to DNS queries includes determining whether a log contains a past entry of a domain name resolution query ("query") to a name server for a full domain name that resulted in a positive reply indicating that the full domain name exists. It is determined whether the log contains a recent entry of the query that resulted in a negative reply indicating that the full domain name did not exist. The server is then queried with a nonce-less query for the full domain name. The server is queried again with a nonce label prepended query for the full domain name to determine if it currently results in the negative reply. The full domain name is flagged as inappropriate for nonce prepending upon determination that querying with a nonce prepended query results in a negative reply and a nonce-less query results in a positive reply.

17 Claims, 5 Drawing Sheets

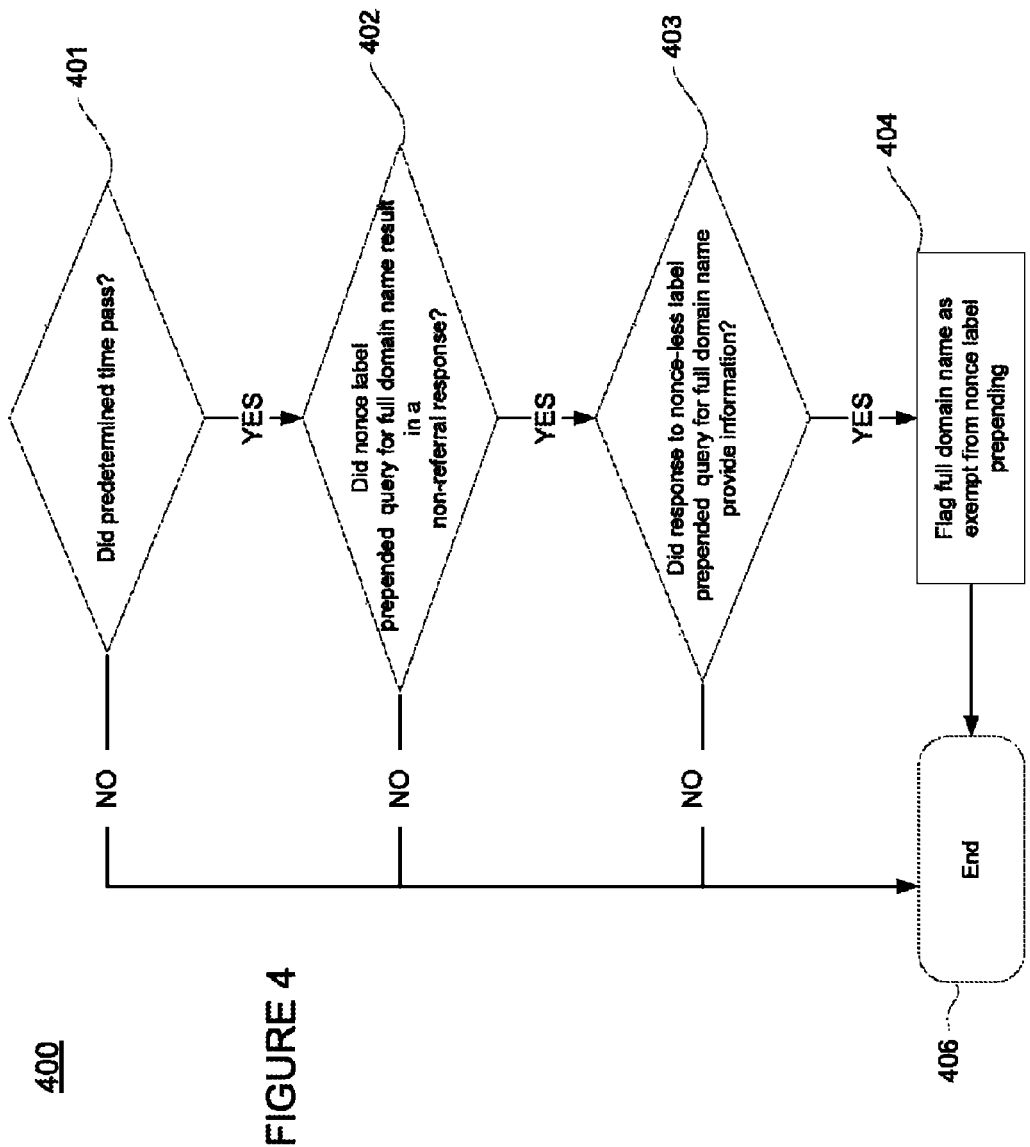

SYSTEMS AND METHODS FOR PREPENDING NONCE LABELS TO DNS QUERIES TO ENHANCE SECURITY

CROSS REFERENCE TO RELATED APPLICATIONS

This application is a continuation of U.S. application Ser. No. 12/903,349, filed on Oct. 13, 2010, now U.S. Pat. No. 8,484,377, the entire disclosure of which is incorporated herein by reference.

FIELD OF INVENTION

The present invention relates generally to Internet security. More particularly, aspects of the invention relate to enhancing protection from hackers by appropriately prepending nonce labels to DNS queries.

BACKGROUND OF THE INVENTION

Domain name system ("DNS") resolvers are typically used to translate domain names meaningful to humans into Internet protocol ("IP") addresses meaningful to computers in order to locate a particular device worldwide. DNS resolvers typically query a DNS server to translate the full domain name into an IP address. Domain names contain one or more segments ("labels") delimited by periods that are translated from right ("top level domain") to left ("low level domain" or "sub domain"). For example, in a full domain name of google.co.uk, the top level domain is ".uk," the sub domain is ".co.uk", and the full domain name is "google.co.uk." When a DNS resolver attempts to resolve a full domain name, it typically queries a root server first. If the root server is authoritative for the top level domain (e.g., ".uk"), the root server will return the IP address of a server capable of resolving the next sub domain (e.g., ".co.uk"). However, if the root server is not authoritative for that particular domain, the root server will refer the query to other authoritative name servers that should be capable of providing a reference or even capable of resolving the entire domain name. In turn, the name server delegated by the root server will also refer the query to yet another name server authoritative for the next sub domain level. This course continues until the full domain name is resolved (e.g., "google.co.uk"). Thus, queries are often forwarded to multiple authoritative DNS servers. However, it is also possible to resolve the full domain name by querying only one authoritative server.

The open and distributed architecture of DNS and its employment of the user datagram protocol ("UDP") make DNS susceptible to various forms of attacks from hackers. Recursive DNS resolvers are especially at risk, since they do not restrict incoming packets to a set of allowed source IP addresses. "Spoofing" is a known hacking technique that aims to redirect users from legitimate websites and domain names to malicious ones. A "Kaminsky attack" is one kind of spoofing tactic that occurs by transmitting a series of queries to the recursive DNS resolver. If the answers are not in the resolver's cache, the resolver will send the queries to other authoritative name servers. Attackers then flood spoofing answers to the resolver that lead to entry of invalid records in the resolver's cache. If a spoofing packet matching the resolver's query arrives at the resolver earlier than valid answers from authoritative name servers, the resolver will direct the query to hacker controlled name servers.

Various solutions for averting spoofing attacks have been tried in the past including prepending nonce labels to DNS queries. One solution attempts to gather DNS resolver logs that include as many hostnames as possible over a period of time (e.g., one month). DNS logs traditionally contain queries and responses to most hostnames. Once the logs are gathered, the following steps are followed: A root DNS server is queried to provide the name servers for a particular zone of interest (e.g., .org, .uk, .jp, .us, .com, etc.). Once the root DNS server replies with a list of name servers, the DNS logs are scanned to find all responses from the list of name servers that returned "authoritative" answers, excluding wildcard responses and bogus responses. For each name server returned, it is determined whether nonce labels are prepended for queries sent to this name server and what queries should not be prepended with nonce labels. Unfortunately, nonce labels cannot be prepended to every query. Rather, nonce labels are prepended to queries that result in a referral to another name server.

BRIEF SUMMARY OF THE INVENTION

Aspects of the invention provide systems and methods that determine the appropriate query for prepending nonce labels. In accordance with one embodiment of the invention a method for prepending nonce labels to DNS queries is provided. The method includes evaluating, with a processor, whether a log stored in memory contains at least one past entry of a domain name resolution query to a name server for a full domain name that resulted in a positive reply indicating that the full domain name did exist.

In another embodiment, the method may also include the processor determining whether the log contains at least one recent entry of the domain name resolution query to the name server for the full domain name that resulted in a negative reply indicating that the full domain name did not exist, if it is determined that the log contains the at least one past entry of the domain name resolution query.

In yet another embodiment, the method may further include the processor determining whether querying the name server with a nonce-less query for the full domain name currently results in the positive reply indicating that the full domain name exists, if it is determined that the log contains the at least one recent entry of the domain name resolution query.

In an additional embodiment, the method may further include the processor determining whether querying the name server with a nonce label prepended query for the full domain name currently results in the positive reply indicating that the full domain name exists, if it is determined that querying the name server with the nonce-less query for the full domain name currently results in the positive reply indicating that the full domain name exists.

In another alternative, the method may additionally include the processor flagging the full domain name as inappropriate for nonce label prepending, if it is determined that querying the name server with a nonce label prepended query for the full domain name currently results in the negative reply indicating that the full domain name does not exist.

In one embodiment of the method, the log is a DNS resolver log. In yet a further embodiment of the method, the nonce-less query is allocated to a separate group, if it is determined that querying the name server with the nonce-less query for the full domain name currently results in the reply indicating that the full domain name exists.

In another embodiment of the method, the full domain name is flagged as inappropriate for nonce label prepending via a configuration file entry.

In accordance with another embodiment of the invention a processing system for prepending nonce labels to DNS queries is provided. The system includes at least one processor and a nonce label analyzer module associated with the at least one processor.

In one embodiment of the processing system, the nonce label analyzer module is configured to evaluate whether a log stored in memory contains at least one past entry of a domain name resolution query to a name server for a full domain name that resulted in a positive reply indicating that the full domain name did exist.

In a further embodiment of the processing system, the nonce label analyzer module is configured to determine whether the log contains at least one recent entry of the domain name resolution query to the name server for the full domain name that resulted in a negative reply indicating that the full domain name did not exist, if it is determined that the log contains the at least one past entry of the domain name resolution query.

In yet a further embodiment of the processing system, the nonce label analyzer module is configured to determine whether querying the name server with a nonce-less query for the full domain name currently results in the positive reply indicating that the full domain name exists, if it is determined that the log contains the at least one recent entry of the domain name resolution query.

In an additional alternative of the processing system, the nonce label analyzer module is configured to determine whether querying the name server with a nonce label prepended query for the full domain name currently results in the positive reply indicating that the full domain name exists, if it is determined that querying the name server with the nonce-less query for the full domain name currently results in the positive reply indicating that the full domain name exists.

In yet an additional alternative of the processing system, the nonce label analyzer module is configured to flag the full domain name as inappropriate for nonce label prepending, if it is determined that querying the name server with a nonce label prepended query for the full domain name currently results in the negative reply indicating that the full domain name does not exist.

In one embodiment, the processing system further comprises a DNS resolver.

In another embodiment of the processing system, the log is a DNS resolver log.

In yet a further embodiment of the processing system, the full domain name is flagged as inappropriate for nonce label prepending via a configuration file entry.

In accordance with yet another embodiment of the invention, an alternate method for prepending nonce labels to DNS queries is provided that includes determining, with a processor, whether a predetermined time duration has expired. In another embodiment, the method includes the processor evaluating whether a log contains at least one nonce label prepended domain name resolution query for a full domain name that resulted in a non-referral response, if it is determined that the predetermined time duration has expired.

In accordance with another embodiment of the method, the processor determines whether the log contains at least one nonce-less domain name resolution query for the full domain name that resulted in a response providing information sought by the query, if it is determined that the log contains the at least one nonce label prepended domain name resolution query resulting in the non-referral response.

In one alternative of the method, the processor flags the full domain name as being exempt from nonce label prepending, if it is determined that the log contains the at least one nonce-less domain name resolution query resulting in a response providing information sought by the query.

In yet a further alternative of the method, the log is a DNS resolver log. In another embodiment, the method includes a DNS resolver that attempts domain name resolution with a nonce-less query, if a previous domain name resolution attempt using a nonce-prepended query fails.

In another alternative of the method, full domain name is flagged as exempt from nonce label prepending via a configuration file entry.

In accordance with another embodiment of the invention an alternate processing system for prepending nonce labels to DNS queries is provided. The system includes at least one processor and a nonce label analyzer module associated with the at least one processor. In one alternate embodiment, the nonce label analyzer module is configured to determine whether a predetermined time duration has expired.

In a further embodiment, the nonce label analyzer module is configured to evaluate whether a log contains at least one nonce label prepended domain name resolution query for a full domain name that resulted in a non-referral response, if it is determined that the predetermined time duration has expired.

In yet a further embodiment, the nonce label analyzer module is configured to determine whether the log contains at least one nonce-less domain name resolution query for the full domain name that resulted in a response providing information sought by the query, if it is determined that the log contains the at least one nonce label prepended domain name resolution query resulting in the non-referral response.

In another alternative, the nonce label analyzer module is configured to flag the full domain name as being exempt from nonce label prepending, if it is determined that the log contains the at least one nonce-less domain name resolution query resulting in a response providing information sought by the query.

In a further alternative, the processing system includes a DNS resolver coupled to the at least one processor, the DNS resolver being configured to attempt domain name resolution with a nonce-less query, if a previous domain name resolution attempt using a nonce-prepended query fails.

In yet another alternative, the processing system includes a DNS resolver log. In yet a further alternative, the full domain name is flagged as exempt from nonce label prepending via an entry in a configuration file.

BRIEF DESCRIPTION OF THE DRAWINGS

FIG. 4 is a flow diagram of another exemplary method for prepending nonce labels domain name queries in accordance with one embodiment of the invention.

DETAILED DESCRIPTION

Systems and methods are provided that determine whether a particular domain name resolution query may be appropriately prepended with a nonce label. In one aspect of the invention, a query log is scanned to find a past entry of a resolution query with a reply indicating that the domain name existed. If found, it is determined whether the query log contains a current entry of the same resolution query with a reply indicating that the domain name does not exist. The query is then retried with and without a prepended nonce label in order to determine whether the query should be flagged as safe for nonce label prepending.

Figure 1:
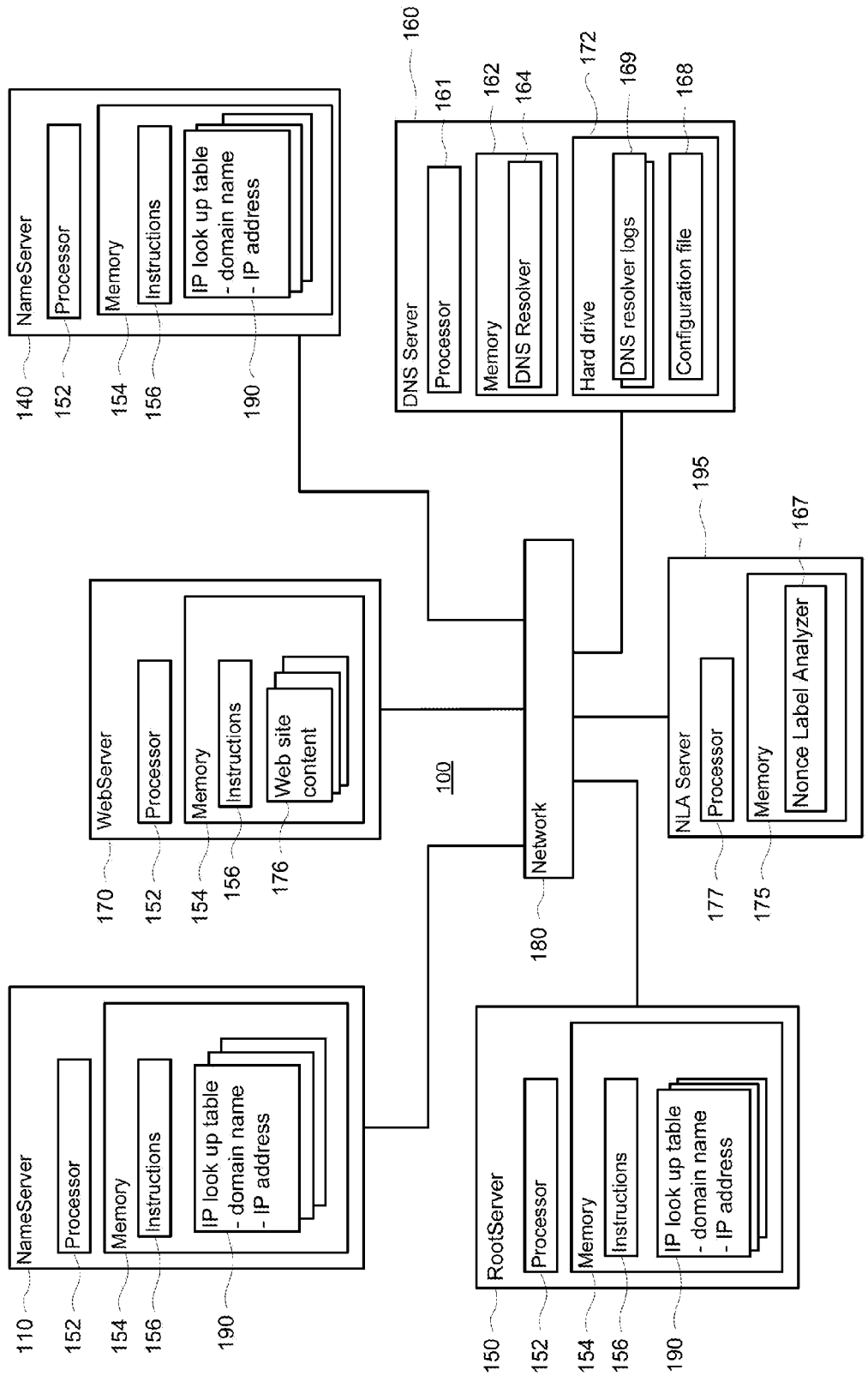
FIG. 1 illustrates a computer network architecture in accordance with aspects of the invention.
Figure 1A:
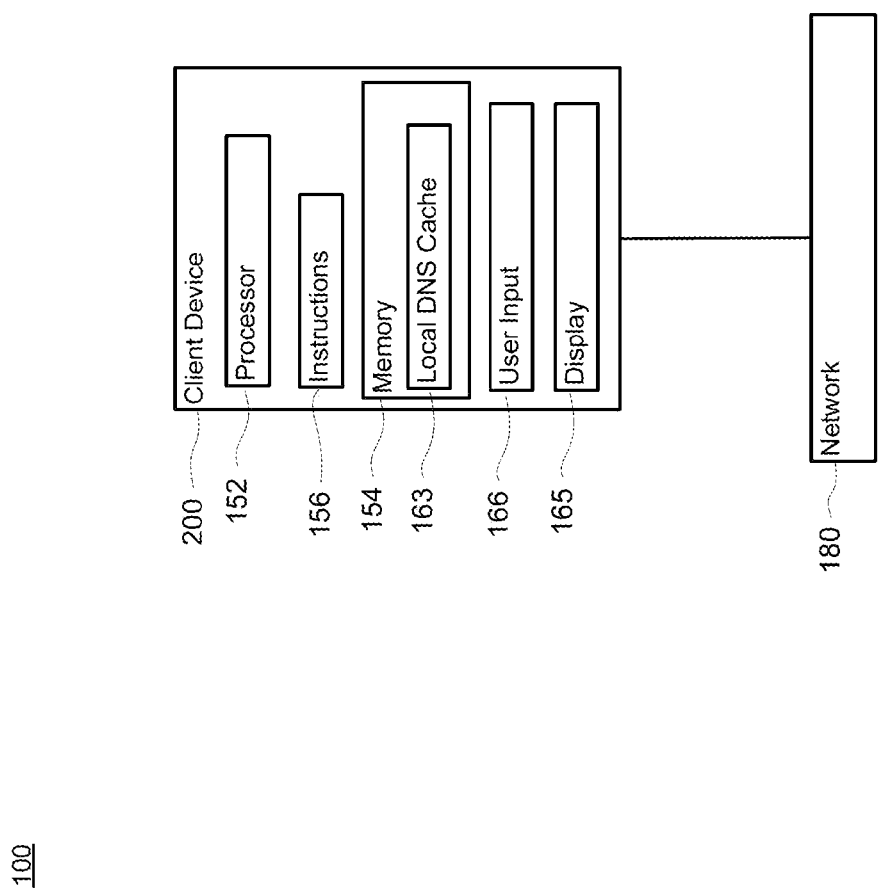
FIG. 1A illustrates a client device connected to a computer network in accordance with aspects of the invention.

As shown in FIG. 1 and FIG. 1A, a system 100 in accordance with one aspect of the invention includes a DNS server 160 containing a processor 161, memory 162 and other components typically present in general purpose computers. The illustrative system of FIG. 1 also provides name servers 110 and 140, root server 150, and a Nonce Label Analyzer ("NLA") server 195. FIG. 1A shows an illustrative client device 200 also connected to the network 180. As will be explained in further detail below, the servers 110, 140, and 150 may be used to resolve different levels of a domain name request by client device 200 via network 180. Web server 170 may host a website sought after by client device 200.

The memory 162 of DNS server 160 stores information accessible by processor 161, including the instructions of the DNS resolver 164 that may be executed by processor 161. The memory 175 of NLA server 195 stores the NLA process 167 that may be executed by processor 177. DNS resolver 164 may produce DNS resolver logs 169 that may be stored in hard drive 172 or other storage media and later loaded into memory 162. In addition, configuration file 168 may be stored in hard drive 172. Configuration file 168 may contain information regarding authoritative servers as will be explained further below. While FIG. 1 shows the NLA process 167 and the DNS resolver 164 on different devices, it is understood that they may both reside on the same device. Since DNS resolvers typically have high resource demands, NLA process 167 is preferably on a separate server.

The memories 162, 154, and 175 may be of any type capable of storing information accessible by processors 161, 152, and 177 including a computer-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media. Memory 154 of client device 200 may also include local DNS cache 163. Local DNS cache 163 may store or retain data such as one or more domain names, associated IP addresses, and time to live, which specifies how long the IP address should reside in cache.

The instructions in DNS resolver 164 and NLA process 167 may be any set of instructions to be executed directly (such as machine code) or indirectly (such as scripts) by the processors 161 and 177, respectively. For example, the instructions may be stored as computer code on a computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

The data in DNS resolver logs 169 and configuration file 168 may be retrieved, stored or modified by processor 161 in accordance with the instructions of DNS resolver 164. Processor 177 may retrieve information from the DNS resolver logs 169 in accordance with the instructions of NLA process 167 to locate queries appropriate for nonce label prepending. NLA process 167 may instruct processor 177 to flag the queries by modifying configuration file 168. Although the systems and methods herein are not limited by any particular data structure, the data in DNS resolver logs 169 and configuration file 168 may be stored in computer registers, in a relational database as a table having a plurality of different fields and records, XML documents, etc.

The processors 152, 161 and 177 may be any conventional processor, such as processors from Intel Corporation or Advanced Micro Devices. Alternatively, the processors may be dedicated controllers such as ASICS. Although FIG. 1 functionally illustrates the processors and memories as being within the same block, it will be understood by those of ordinary skill in the art that processors 152, 161 and 177 and memories 154, 162 and 175 may actually comprise multiple processors and memories that may or may not be stored within the same physical housing. For example, memory 162 may be a hard drive or other storage media located in a server farm of a data center. Accordingly, references to a processor or computer will be understood to include references to a collection of processors or computers or memories that may or may not operate in parallel.

The client device 200 may be at one node of a network 180 and capable of directly and indirectly communicating with other nodes of the network. For example, web server 170 may be capable of communicating with client device 200 via network 180 such that web server 170 uses network 180 to transmit and display information to a user such as on display 165 of client device 200. Accordingly, web site content 176 of web server 170 may be used to generate and display a web site on client device 200. Web server 170 may also comprise a plurality of computers, such as a load balancing network, that exchange information with different nodes of a network for the purpose of receiving, processing and transmitting data to multiple client devices. In this instance, the client devices will typically still be at different nodes of the network than any of the computers comprising server 170.

Name server 110, name server 140, root server 150, web server 170, and client device 200 may all comprise a processor 152, memory 154, and instructions 156. Name servers 110,140 and root server 150 may also include an IP address lookup table 190 which maps associations between domain names and IP addresses. For example, under DNS protocol, an "A" record is used to map hostnames to 32-bit IPv4 addresses and an "AAAA" record maps hostnames to 128-bit IPv6 addresses. It is understood that IP address lookup table 190 may contain other record types specified by the DNS protocol or any other standardized protocol. In this regard, in response to receiving a request for identifying a domain name, for example "www.a.com," from a node of network 180, name servers 110,140 or root server 150 may provide the requesting node with an IP address. If the servers do not have authority to respond to the request, they may provide the IP address or domain name of another name server with the authority.

Network 180 and intervening nodes may comprise various configurations and use various protocols including the Internet, World Wide Web, intranets, virtual private networks, local Ethernet networks, private networks using communication protocols proprietary to one or more companies, cellular and wireless networks (e.g., WiFi), instant messaging, HTTP and SMTP, and various combinations of the foregoing. Although only a few computers are depicted in FIG. 1, it should be appreciated that a typical system can include a large number of connected computers.

Each node on the network may be associated with both a network address and a physical address. For example, each device may be assigned an IP address. An IP address may be expressed as binary numbers or various combinations of numbers, letters, or both. By way of example, name server 110, name server 140, root server 150, DNS server 160, client device 200, and web server 170 may each be identified by an IP address, for example, 0110, 0140, 0150, 0160, and 0170 respectively. It will be understood that the IP addresses are typically 32-bits or 128-bit integers and may be displayed in various ways, for example 3479374081 or 207.99.9.1.

Additional client devices may be configured similarly to client device 200, with a processor 152 and a memory 154. Client device 200 may be a personal computer intended for use by a person, and have all of the components normally used in connection with a personal computer such as electronic display 165 (e.g., a monitor having a screen, a touch-screen, a projector, a television, a computer printer or any other electrical device that is operable to display information), and end user input 166 (e.g., a mouse, keyboard, touch-screen or microphone).

Although the client device 200 may comprise a full-sized personal computer, they may alternatively comprise mobile devices capable of wirelessly exchanging data with a server over a network such as the Internet. By way of example only, client device 200 may be a wireless-enabled PDA or a cellular phone capable of obtaining information via the Internet. The user input 166 may be a small keyboard (in the case of a Blackberry-type phone), a keypad (in the case of a typical cellular phone) or a touch screen (in the case of a PDA).

Figure 2:
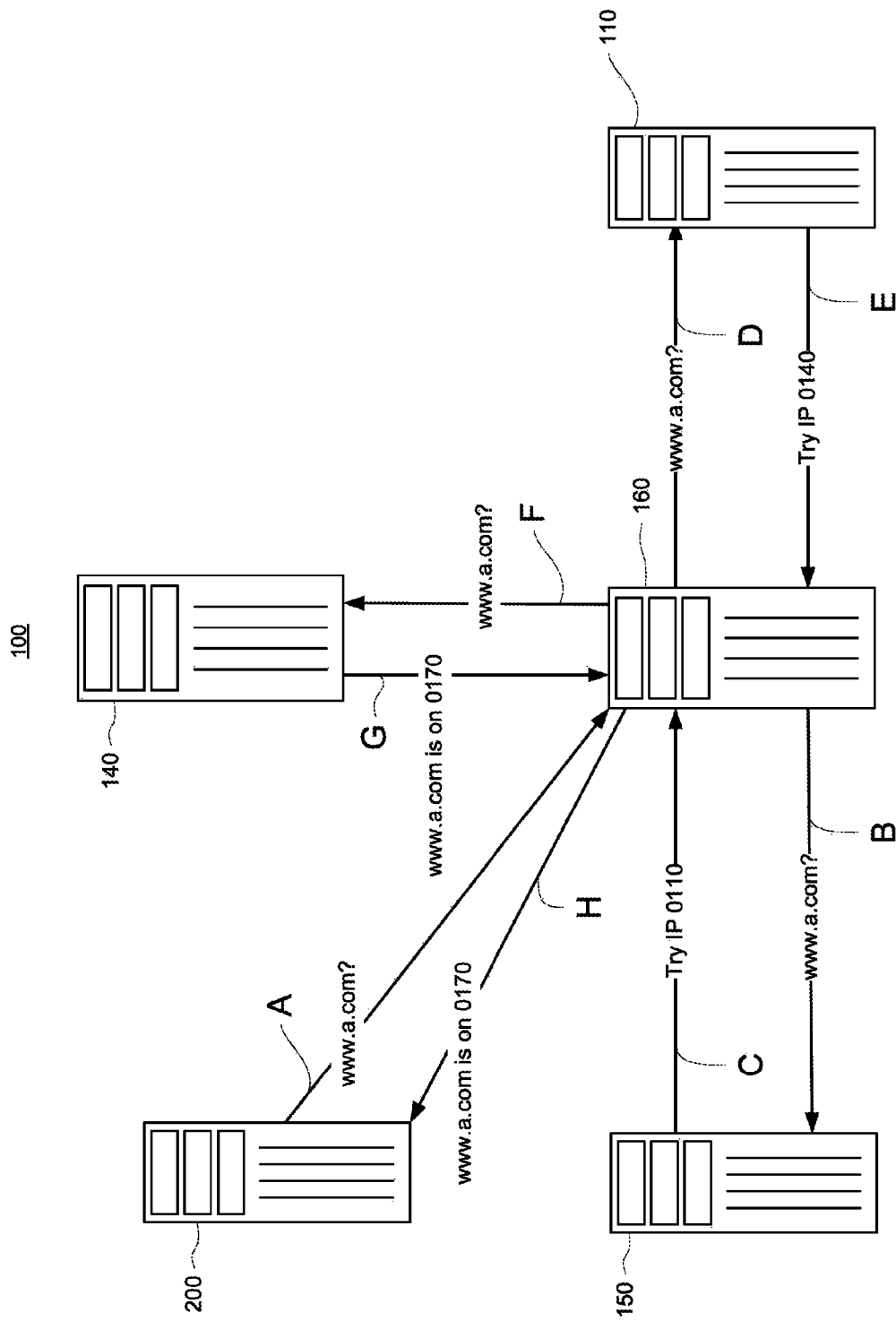
FIG. 2 illustrates a working example of computer network interaction in accordance with aspects of the invention.

A user may request a particular web site, such as "www.a.com," by entering the domain name into a browser of the user's client device 200. Next, client device 200, by way of its processor 152, may query local DNS cache 163 for the corresponding IP address. By way of example, assume web server 170 hosts the website named "www.a.com" as shown in FIG. 1. The local DNS cache 163 may not contain the corresponding IP address, for example, if the client device has not previously requested "www.a.com," or alternatively if the cache had been wiped to remove this information. As a result, the client device may query the DNS server 160 by sending a request for the IP address identifying the domain name, as shown in query A of FIG. 2. In turn, DNS server 160 queries root server 150, as shown in query B. In the example of FIG. 2, root server 150 cannot answer the query and therefore responds with the IP address of another name server such as name server 110 having an IP address of 0110, as shown in reply C. The DNS resolver 164 may then direct the query to name server 110, as shown in query D. In the example of FIG. 2, name server 110 is authoritative for the ".com" zone. Thus, name server 110 is able to refer the query to a name server authoritative for the full domain name (e.g., "www.a.com"), as shown in reply E. In the illustration of FIG. 2, name server 140 is authoritative for the full domain name "www.a.com," therefore name server 110 replies to the DNS resolver's query by supplying the IP address of name server 140, which instructs the DNS resolver to direct the query to name server 140, as shown in query F. Finally, name server 140 provides the IP address of web server 170 which, in the example of FIG. 2, hosts the website "www.a.com," as shown in reply G. In reply H, client device 200 receives the IP address of web server 170 from DNS resolver 164. Receipt of the IP address allows client device 200 to request the contents of the website "www.a.com" from web server 170.

An attacker can direct DNS resolver 164 to a name server containing malicious IP addresses in its IP look up table. Thus, a user can be directed to a server under the control of the attacker. Prepending nonce labels to the domain name is a way to avert these kinds of attacks. However, as stated earlier, nonce labels may only be made when querying a server resulting in a referral to another server and not when querying an authoritative name server. By way of example, the query for "www.a.com" can be prepended with a nonce label such as "nonce5678.www.a.com." This nonce label prepended query may be sent to root server 150 or name server 110, since those servers will simply reply with a referral to another server and they are not authoritative for the full domain name. However, since name server 140 is authoritative for the full domain name, the query for "nonce5678.www.a.com" may not be sent to name server 140. Upon receipt of a query for "nonce5678.www.a.com," name server 140 will reply that the domain name does not exist. Under DNS protocol, name server 140 can indicate that the domain name does not exist by providing a response code of "NXDOMAIN" in its reply. Another difficulty is when authoritative servers are changed for administrative purposes. Servers that were once authoritative may be removed or a server that was authoritative for a particular zone may now be authoritative for the full domain name.

Figure 3:
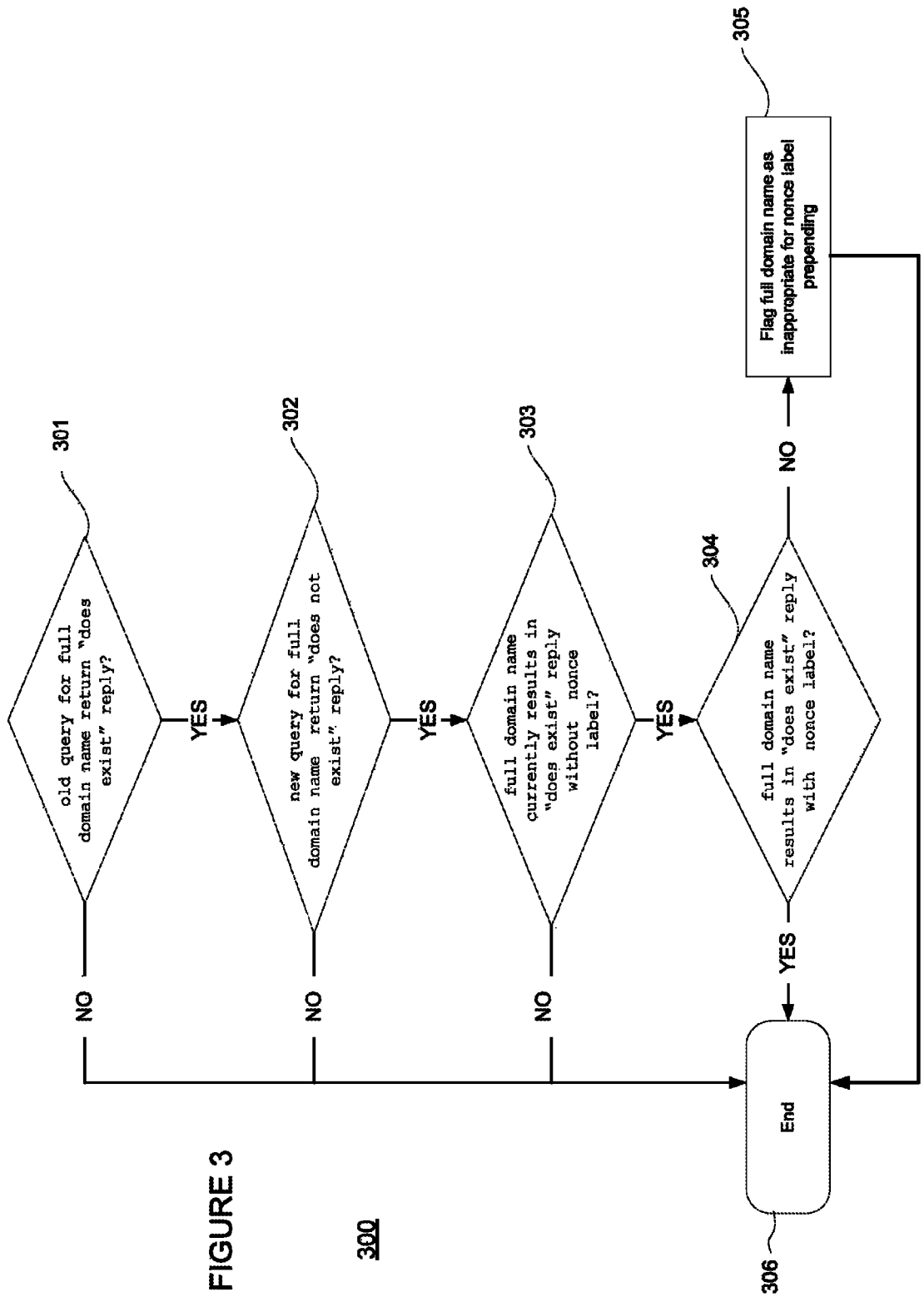
FIG. 3 is a flow diagram of an exemplary method for prepending nonce labels domain name queries in accordance with one embodiment of the invention.

Referring to FIG. 3, an exemplary embodiment of a method 300 of determining when it is appropriate to prepend a nonce label is disclosed that may be executed by NLA process 167. First, in block 301, the NLA process 167 may scan the DNS resolver logs 169 to determine if the logs contain at least one past entry of a domain name resolution query to a name server for a full domain name with a reply indicating that the domain name did exist. The past entry of the domain name resolution query may have taken place, for example, ten days ago. If the logs do contain at least one past entry of a domain name resolution query to a name server for a full domain name with a reply indicating that the domain name did exist, NLA process 167 may advance to block 302 and determine if the DNS resolver logs 169 contain at least one recent entry of the same domain name resolution query to the same name server for the full domain name with a reply indicating that the domain name does not exist.

It should be noted that the NLA may search for responses to domain name resolution queries with and without nonce labels in the previous two blocks. If the DNS resolver logs 169 do contain at least one recent entry of the domain name resolution query to the name server for the full domain name with a reply indicating that the domain name does not exist, NLA process 167 may determine if a nonce-less query for the full domain name currently results in a reply indicating that the domain name does exist, as shown in block 303. If the nonce-less resolution query currently results in a reply indicating that the domain name does exist, NLA process 167 may advance to block 304 and determine if querying the name server for the full domain name with a prepended nonce label also results in a reply indicating that the domain name does exist. Full nonce-less domain name resolution queries with replies indicating that the domain name exists may be stored in a separate group such as a separate data structure. If the prepended full domain name resolution query results in a reply indicating that the domain name does not exist, NLA process 167 may advance to block 305 and flag the full domain name as inappropriate for nonce label prepending. If the reply indicates that the domain name does exist despite the prepended query, NLA process 167 may advance to block 306 and terminate processing, since all queries are preferably defaulted as safe for nonce label prepending. The flagging may be done in configuration file 168. If any of the conditions in blocks 301-303 are not satisfied, the NLA process 167 may advance to block 306 and terminate processing. Before querying a name server, the DNS resolver 164 may determine whether prepending a nonce label to the query is appropriate by evaluating the flag in configuration file 168. The flag may be set to a Boolean value of "true" or "false" and may be associated with a name server and a hostname.

FIG. 4 provides another embodiment of a method 400 that works with a DNS resolver 164. The scenario in FIG. 4 assumes that DNS resolver 164 retries a domain name resolution query without a nonce label when the same query attempted previously with a nonce label received a non-referral response. First, NLA process 167 may determine whether predefined time duration has passed in order to begin scanning the DNS resolver logs 169 in block 401. By way of example, NLA process 167 can scan logs after a day or after one week. If NLA process 167 determines that the predefined time duration has expired, NLA process 167 may advance to block 402 and determine whether the DNS resolver logs 169 contain at least one nonce label prepended domain name resolution query to a name server for a full domain name that resulted in a non-referral response.

If the DNS resolver logs 169 contain at least one nonce label prepended domain name resolution query to a name server for a full domain name that resulted in a non-referral response, NLA process 167 may advance to block 403 to determine if the DNS resolver logs 169 contain at least one nonce-less domain name resolution query to a name server for the full domain name that resulted in a response providing the information sought by the query. For example, if the query sought an IP address, a direct response would be to provide the IP address and not an error message. If the DNS resolver logs 169 contain a nonce-less domain name resolution query to a name server for at least one full domain name that resulted in a response providing the information sought by the query, NLA process 167 may advance to block 404 and flag the full domain name as being exempt from nonce label prepending. Like the embodiment of FIG. 3, all queries are defaulted as safe for nonce label prepending and the flag may be stored in configuration file 168. If any of the conditions in blocks 401-403 are not satisfied, NLA process 167 may advance to block 406 and terminate processing.

Although the invention herein has been described with reference to particular embodiments, it is to be understood that these embodiments are merely illustrative of the principles and applications of the invention. It is therefore to be understood that numerous modifications may be made to the illustrative embodiments and that other arrangements may be devised without departing from the spirit and scope of the invention as defined by the appended claims. Furthermore, while particular processes are shown in a specific order in the appended drawings, such processes are not limited to any particular order unless such order is expressly set forth herein.

The invention claimed is:

1. A method for prepending nonce labels to DNS queries, the method comprising:
evaluating whether a log contains a past entry of a domain name resolution query to a name server;
determining whether the log contains a recent entry of the domain name resolution query to the name server for a full domain name that resulted in a reply indicating that the full domain name did not exist;
determining whether querying the name server with a nonce-less query for the full domain name currently results in a reply indicating that the full domain name exists;
determining, with a processor, whether querying the name server with a nonce label prepended query for the full domain name currently results in the reply indicating that the full domain name exists; and
the processor flagging the full domain name as inappropriate for nonce label prepending, when it is determined that querying the name server with the nonce label prepended query indicates that the full domain name does not exist.

2. The method of claim 1, wherein the log is a DNS resolver log.

3. The method of claim 1, further comprising allocating the nonce-less query to a separate group, upon determination that the full domain name exists.

4. The method of claim 1, wherein the full domain name is flagged as inappropriate for nonce label prepending via a configuration file entry.

5. A processing system for prepending nonce labels to DNS queries, the system comprising:
at least one processor;
a nonce label analyzer module associated with the at least one processor, the nonce label analyzer module being configured:
to evaluate whether a log contains a past entry of a domain name resolution query to a name server,
to determine whether the log contains a recent entry of the domain name resolution query to the name server for a full domain name that resulted in a negative indicating that the full domain name did not exist,
to determine whether querying the name server with a nonce-less query for the full domain name currently results in a reply indicating that the full domain name exists,
to determine whether querying the name server with a nonce label prepended query for the full domain name currently results in the positive reply indicating that the full domain name exists, and
to flag the full domain name as inappropriate for nonce label prepending, when it is determined that querying the name server with the nonce label prepended query indicates that the full domain name does not exist.

6. The processing system of claim 5, further comprising a DNS resolver.

7. The processing system of claim 5, wherein the log is a DNS resolver log.

8. The processing system of claim 5, wherein the full domain name is flagged as inappropriate for nonce label prepending via a configuration file entry.

9. The processing system of claim 5, wherein the nonce label analyzer module is further configured to allocate the nonce-less query to a separate group upon determination that the full domain name exists.

10. A method for prepending nonce labels to DNS queries, the method comprising:
evaluating whether a log contains at least one nonce label prepended domain name resolution query for a full domain name that resulted in a non-referral response, upon determination that a predetermined time duration has expired;
determining, with a processor, whether the log contains a nonce-less domain name resolution query for the full domain name; and
the processor flagging the full domain name as being exempt from nonce label prepending, upon determination that the log contains the nonce-less domain name resolution query.

11. The method of claim 10, wherein the log is a DNS resolver log.

12. The method of claim 11, further comprising attempting domain name resolution with a nonce-less query when a previous domain name resolution attempt using a nonce-prepended query has failed.

13. The method of claim 10, wherein the full domain name is flagged as exempt from nonce label prepending via a configuration file entry.

14. A processing system for prepending nonce labels to DNS queries the system, comprising:
- at least one processor; and
- a nonce label analyzer module associated with the at least one processor, the nonce label analyzer module being configured:
- to evaluate whether a log contains at least one nonce label prepended domain name resolution query for a full domain name that resulted in a non-referral response, upon determination that a predetermined time duration has expired,
- to determine whether the log contains a nonce-less domain name resolution query for the full domain name, and
- to flag the full domain name as being exempt from nonce label prepending, upon determination that the log contains the nonce-less domain name resolution query.

15. The processing system of claim 14, further comprising a DNS resolver coupled to the at least one processor and being configured to attempt domain name resolution with a nonce-less query when a previous domain name resolution attempt using a nonce-prepended query has failed.

16. The processing system of claim 14, wherein the log is a DNS resolver log.

17. The processing system of claim 14, wherein the full domain name is flagged as exempt from nonce label prepending via an entry in a configuration file.

* * * * *